Sept. 3, 1946. H. C. HARRIS 2,407,006
BUSTER GANG PLOW
Filed Nov. 30, 1942 3 Sheets-Sheet 1
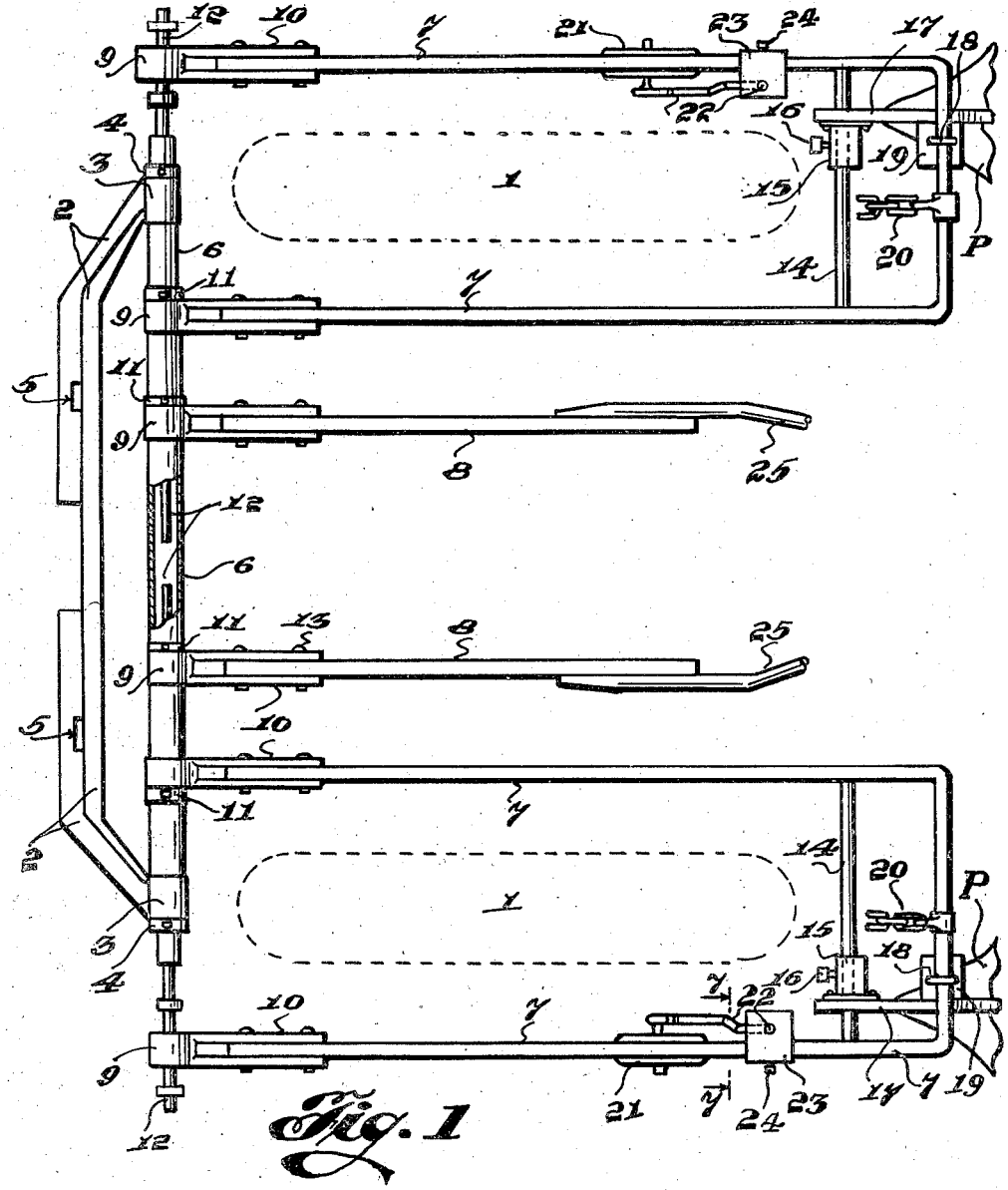
HENRY CLAYTON HARRIS
INVENTOR.
BY John M. Spellman
ATTORNEY

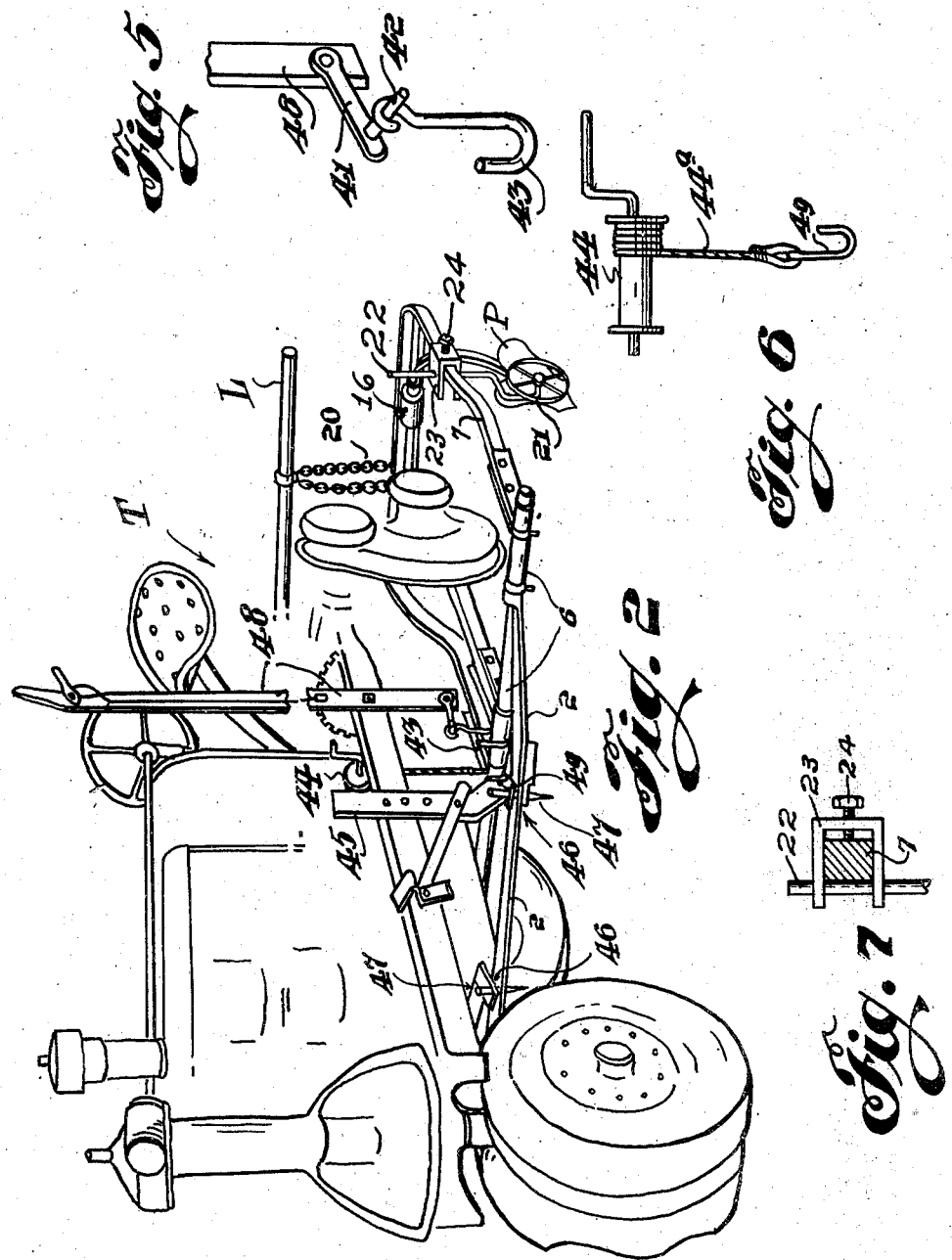

Sept. 3, 1946. H. C. HARRIS 2,407,006
BUSTER GANG PLOW
Filed Nov. 30, 1942 3 Sheets-Sheet 3
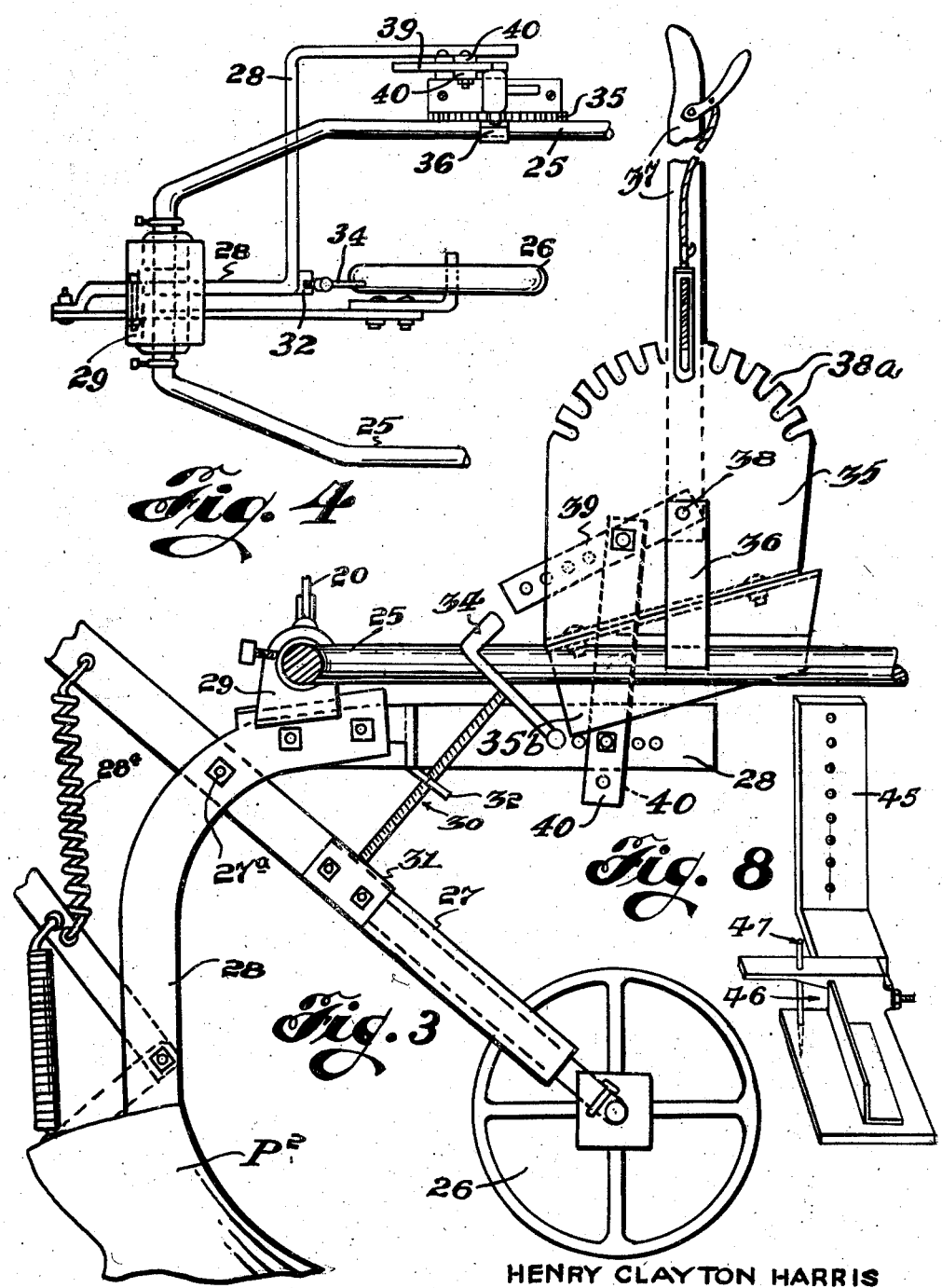
HENRY CLAYTON HARRIS
INVENTOR.
BY John M. Spellman
ATTORNEY Patented Sept. 3, 1946

2,407,006

UNITED STATES PATENT OFFICE 2,407,006

BUSTER GANG PLOW

Henry Clayton Harris, Pittsburg, Tex.

Application November 30, 1942, Serial No. 467,326

6 Claims. (Cl. 97—47)

This invention relates to buster gang plows and in such connection it relates more particularly to a plow of this character designed to be attached to a farm tractor, and of a type similar to applicant's U. S. Letters Patent No. 2,255,253, issued September 9, 1941.

The primary object of the present invention is to improve the draw-bar construction of the plow whereby the plow may be more easily and readily attached and detached from a farm tractor in a minimum of time and labor.

Another object of the invention resides in the novel manner for individual and separate operation of each plow in the gang whereby each plow may be set for a certain depth.

Another object of the invention resides in the simple gage wheel means for setting the depth of the plows, each plow being provided with a separate gage wheel and adjusting member.

With the above and other objects in view, the invention will be readily understood from a perusal of the following detailed description, taken in connection with the accompanying drawings, and in the drawings:

Figure 1 is a top plan view of the buster gang plow removed from the tractor, the middle plow not being shown;

Figure 2 is a perspective view, showing one side of a farm tractor in part, with the buster gang plow in operative position thereon;

Figure 3 is an enlarged side elevational view in part of the center frame showing the center plow connected thereto;

Figure 4 is a top plan view of Figure 3 on a reduced scale, showing the plow beam and parts;

Figure 5 is a detail perspective view of a lever and hook for holding the plow frame in position;

Figure 6 is a detail view of a windlass and cable for lifting the plow frame to position;

Figure 7 is a cross-sectional view of Fig. 1 taken on the line 7—7 thereof; and

Figure 8 is an enlarged detail perspective view of an angular member for removably supporting the draw bar to the tractor.

Referring more in detail to the drawings, in Figure 1 is illustrated the drive wheels of a farm tractor for the purpose of indicating the position the plow frame occupies therein, the drive wheels being indicated at 1. The plow frame consists of a draw bar 2 having cuffs 3, the latter being held in adjustable set position by the lock nuts 4. Apertures 5 in the draw bar 2 serve in connection with pins to hold the draw bar in position on the tractor. The draw bar 2 by means of the cuffs 3 is fastened to an outer hollow rod 6 to which are also attached arms 7, the arms 7 forming a substantially U-shaped member for the outside plows only. Likewise center arms 8 provide a support for a center plow, all the arms 7 and 8 being fastened to the outer hollow rod 6 by means of cuffs 9 having spaced fingers 10 to embrace the rods 7 and 8. Each cuff 9 is provided with suitable securing means indicated at 11. Inside the hollow rod 6 are two smaller rods 12 which project beyond the outer ends of the rod 6. Bolts 13 hold the arms 7 and 8 to the fingers 10. At the U-shaped portions of the outer frames are cross bars 14 on which are slidably supported cuffs 15 and provided with set screws 16. The plow beams are then bolted to the cuffs and which serve to support a plow P of the buster type, the plow beams being further supported on the frame by a U-bolt and plate 18 and 19, respectively. Chains 20 connect the rear ends of the U-shaped frame to a power lift L, see Figure 2.

The frame provides gage wheels 21 mounted on arms 22, the latter being adjustably supported vertically and longitudinally of the outer arms 7 to ensure proper gage and depth of the buster plows. By reference to Figures 1 and 7 it will be readily seen that the arms 22 of the gage wheels project through a spring clip 23, slidably disposed on the outer arms 7, and set screws 24, when tightened or loosened, hold and release the gage wheels in desired set position.

The center arms 8 are welded to the U-shaped portion of the frame at the point where the rod or U-shaped portion is rounded.

For bringing about the setting of the depth of a center plow P—2 there is provided a threaded rod 30 the end of which is in contact with an angle iron 31 on an arm 27 which carries a gage wheel 26. The arm 27 is pivoted by bolt 27—a to a plow beam 28, the upper end of the arm 27 being under tension of a spring 28—a. A small plate 32 is bored to receive a threaded rod 30 and over this hole is fixed a threaded nut 33, the plate 32 being welded in the forks of the plow beam 28. By this arrangement, rotation of a small crank arm 34 mounted on rod 30 will either place the plow deeper or shallower, as the threaded rod 30 comes in contact with the angle iron 31 and the spring 28—a places compression on the rod 30.

Included in the construction of the rear end of the center frame for the central plow is a ratchet plate 35 which is bolted to an angular member 35—b, the latter being welded to one side of the rounded U-shaped arms 25 (see Figures 3 and 4). There is also provided a vertical arm 36 with an opening in its upper end, the lower end of this vertical arm being welded to the arm 25. A pin 38 works in the opening of the arm 36, also through the ratchet plate 35, and is welded to the lever 37 which works in the slots 38—a of the ratchet plate 35, the latter being bolted to the angular member 35—b. The member 35—b is welded to the U-shaped arm 25. The assembly of parts in this construction includes a bar 39 with a hole therein and which bar is slipped over the pin 38, and two similar bars 40 (one on each side of the bar 39) the bars 40 both being secured to the plow beam 28 and bar 39.

Referring to Figures 2, 5 and 6, the tractor includes a lever 48 and to this lever is fastened a link 41 with pin 42, and a hook 43 (one on each side of the frame, both sides of the frame being the same) carried on the pin 42 is slipped under the outer shaft 6.

For lifting the frame carrying the plows to position there is also provided a windlass, the windlass being shown in detail in Figure 6 at 44 and also in operative position, in Figure 2. It carries a small cable 44—a with a hook 49 the hook being also slipped under the outer shaft 6 when the plow frame is being lifted to position to be supported in the hook 43, carried on the lever 48.

In applying or attaching the plow to a tractor such as indicated generally at T, place the outer shaft 6 on the ground, then back drive wheels 1 of the tractor over the outer shaft 6, attach the hook 49 of the windlass 44 to the hollow shaft 6 and wind the windlass 44 until the frame of the plow is at the proper height. Then place the hook 43 under shaft 6, and slip the eye of the hook over the pin 42. This refers to the hooks on both sides of the chassis or frame, both sides being the same. The windlass hook 49 is then loosened. Then pull tractor forward approximately four inches, placing the drawbar 2 in the recess 46 of the angular member 45, see Figure 8. The pins 47 are then put in position as shown, passing through the openings 5 in the drawbar 2. Finally the chains, shown at 20 are attached to the power-lift shaft L of the tractor.

The plow can be attached or detached quickly and easily and can be adjusted in a few minutes from eighteen inches up to five feet three inches by loosening one of the lock nuts 11 on the inside arms 7 (see Fig. 1) and by shifting the arms 7 on the rod 6, at the same time forcing the inner rods 12 outwardly. The gage wheels are very easily manipulated, the gage of draft or the level of the busters can be set on the point or points of busters and the points turned up or down or set with plow point running level or flat by the set of the lever 48. If the busters are desired to be run on the points, the lever 48 is pushed forwardly, if to run flat lever 48 is pulled backwardly, which raises shaft 6 to which the plow frame or frames are fastened. Each plow operates separately of the other and according to the level of the land. In plowing a terrace, should the plows get astraddle thereof with the two outside plows on each side of the terrace where the ground is low and the center plow on the high point or ridge of the terrace and the center plow following the ridge or high point of the terrace all the way then the lever 37 on the center plow is pulled forwardly according to the height of the terrace, to make buster points on the center plow have the right set. If the drain ditch or channel of the terrace is followed with the center plow and two outside plows on higher ground the lever 37 is pulled backwardly, which puts the center buster on the point. In plowing on practically level ground or soil the lever 37 should be set in center notch of the ratchet plate 35 to plow the same as the outside plows.

From the foregoing it is believed anyone may readily understand the invention also its mode of attaching to a tractor and its operation, without further explanation. It is pointed out that while the disclosure presents a practical working embodiment of the improved gang plow, there are possibilities of modification and alteration therein, such as would be within the general inventive thought and which would come within the scope and meaning of the appended claims.

What is claimed is:

1. In combination with a tractor having a pair of driving wheels, an implement attaching frame therefor, comprising a transverse member having a pair of spaced implement carrying frame members extending rearwardly therefrom and hingedly secured thereto, each adapted to enclose one of the drive wheels of the tractor, and hoisting means carried by the tractor for raising and temporarily supporting the transverse member to permit more permanent attachment of the implement frame to the tractor, other supporting means carried by the tractor for subsequently retaining the transverse member in the raised position, and a draw bar member hingedly secured to the transverse member and adapted to be secured beneath the front end of the tractor, and means for adjusting said other supporting means.

2. In combination with a tractor or the like having a pair of driving wheels, an implement attaching frame comprising a transverse frame member adapted to be adjustably and detachably supported beneath the front end of the tractor, a pair of individual U-shaped implement carrying frames extending rearwardly from the transverse member and swingingly secured thereto and each adapted to enclose one of the driving wheels of the tractor, earth working implements carried by each of said frames and means for adjusting said implements comprising means for raising or lowering the transverse member as a whole, and means for raising or lowering the individual implement carrying frames with reference to the transverse member.

3. In combination with a tractor or the like having a pair of driving wheels, an implement carrying attachment adapted to be removably secured to the tractor and serving to adjustably support a plurality of implements, said attachment comprising a draw bar member adapted to be releasably and yieldingly secured beneath the front end of the tractor and having a pair of rearwardly extending arms, a transverse rod member releasably carried by said arms, a pair of individual U-shaped implement carrying frames extending rearwardly from said rod and hingedly secured thereto and each enclosing one of the tractor driving wheels, individual earth working implements carried by said individual U-shaped frames at the rear of the tractor wheels, and means for raising and lowering said transverse rod member while supported by said draw bar.

4. In combination with a tractor or the like having a pair of driving wheels, an implement carrying attachment adapted to be removably secured to the tractor and serving to adjustably support a plurality of implements, said attachment comprising a draw bar member adapted to be releasably and yieldingly secured beneath the front end of the tractor and having a pair of rearwardly extending arms, a transverse rod member releasably carried by said arms, a pair of individual U-shaped implement carrying frames extending rearwardly from said rod and hingedly secured thereto and each enclosing one of the tractor driving wheels, individual earth working implements carried by said individual U-shaped frames at the rear of the tractor wheels, means for raising and lowering said transverse rod member while supported by said draw bar, and means for individually adjusting said implements.

5. In combination with a tractor or the like having a pair of driving wheels, an implement carrying attachment adapted to be removably secured to the tractor and serving to adjustably support a plurality of implements, said attachment comprising a draw bar member adapted to be releasably and yieldingly secured beneath the front end of the tractor and having a pair of rearwardly extending arms, a transverse rod member releasably carried by said arms, a pair of individual U-shaped implement carrying frames extending rearwardly from said rod and hingedly secured thereto and each enclosing one of the tractor driving wheels, individual earth working implements carried by said individual U-shaped frames at the rear of the tractor wheels, means for raising and lowering said transverse rod member while supported by said draw bar, and an additional implement carrying frame swingingly connected to the transverse rod intermediate the tractor wheels.

6. In combination with a tractor or the like having a pair of driving wheels, an implement carrying attachment adapted to be removably secured to the tractor and serving to adjustably support a plurality of implements, said attachment comprising a draw bar member adapted to be releasably and yieldingly secured beneath the front end of the tractor and having a pair of rearwardly extending arms, a transverse rod member releasably carried by said arms, a pair of individual U-shaped implement carrying frames extending rearwardly from said rod and hingedly secured thereto and each enclosing one of the tractor driving wheels, individual earth working implements carried by said individual U-shaped frames at the rear of the tractor wheels, means for raising and lowering said transverse rod member while supported by said draw bar, and hoisting means carried by the tractor for initially raising and temporarily supporting the transverse rod prior to attachment of the draw bar to the tractor.

HENRY CLAYTON HARRIS.